US012812567B2

(12) United States Patent
Zorgui et al.

(10) Patent No.: US 12,812,567 B2
(45) Date of Patent: Nov. 24, 2026

(54) UNUSED TRANSMISSION OCCASION (UTO) ENABLED TRANSMISSION POWER INCREASE

(71) Applicant: QUALCOMM Incorporated, San Diego, CA (US)

(72) Inventors: Marwen Zorgui, San Diego, CA (US); Diana Maamari, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 284 days.

(21) Appl. No.: 18/583,586

(22) Filed: Feb. 21, 2024

(65) Prior Publication Data

US 2025/0267591 A1 Aug. 21, 2025

(51) Int. Cl.

| | |
|---|---|
| ***H04W 52/36*** | (2009.01) |
| ***H04W 52/08*** | (2009.01) |
| ***H04W 72/1268*** | (2023.01) |
| ***H04W 72/231*** | (2023.01) |

(52) U.S. Cl.

CPC ......... *H04W 52/367* (2013.01); *H04W 52/08* (2013.01); *H04W 52/365* (2013.01); *H04W 72/1268* (2013.01); *H04W 72/231* (2023.01)

(58) Field of Classification Search

CPC . H04W 52/367; H04W 72/231; H04W 52/08; H04W 52/365; H04W 72/1268

See application file for complete search history.

(56) References Cited

U.S. PATENT DOCUMENTS

| | | | | |
|---|---|---|---|---|
| 11,564,178 | B2 * | 1/2023 | Kumar .................. | H04W 52/50 |
| 2018/0213486 | A1 * | 7/2018 | Yoo ..................... | H04W 52/241 |
| 2019/0230599 | A1 * | 7/2019 | Nam ..................... | H04W 76/27 |

* cited by examiner

*Primary Examiner* — Chandrahas B Patel

(74) *Attorney, Agent, or Firm* — Patterson & Sheridan LLP

(57) ABSTRACT

Certain aspects of the present disclosure provide techniques for Unused Transmission Occasion (UTO) Enabled Transmission Power Increase. An example method, performed at a first wireless node, generally includes obtaining first signaling configuring the first wireless node with transmission occasions (TOs), outputting second signaling indicating one or more unused TOs (UTOs) that correspond to one or more of the configured TOs that will be skipped by the first wireless node, and adjusting transmit power of a current or future transmission based on the one or more UTOs indicated in the second signaling.

29 Claims, 11 Drawing Sheets

UNUSED TRANSMISSION OCCASION (UTO) ENABLED TRANSMISSION POWER INCREASE

FIELD OF THE DISCLOSURE

Aspects of the present disclosure relate to wireless communications, and more particularly, to techniques for adjusting transmission power based on unused transmission occasions.

DESCRIPTION OF RELATED ART

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a first wireless node. The method includes obtaining first signaling configuring the first wireless node with transmission occasions (TOs); outputting second signaling indicating one or more unused TOs (UTOs) that correspond to one or more of the configured TOs that will be skipped by the first wireless node; and adjusting transmit power of a current or future transmission based on the one or more UTOs indicated in the second signaling.

Another aspect provides a method for wireless communications at a second wireless node. The method includes outputting first signaling configuring a first wireless node with transmission occasions (TOs); and outputting second signaling configuring the first wireless node to adjust transmit power of a current or future transmission based on one or more unused TOs (UTOs) that correspond to one or more of the configured TOs that will be skipped by the first wireless node.

Other aspects provide: an apparatus operable, configured, or otherwise adapted to perform any one or more of the aforementioned methods and/or those described elsewhere herein; a non-transitory, computer-readable media comprising instructions that, when executed (e.g., directly, indirectly, after pre-processing, without pre-processing) by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
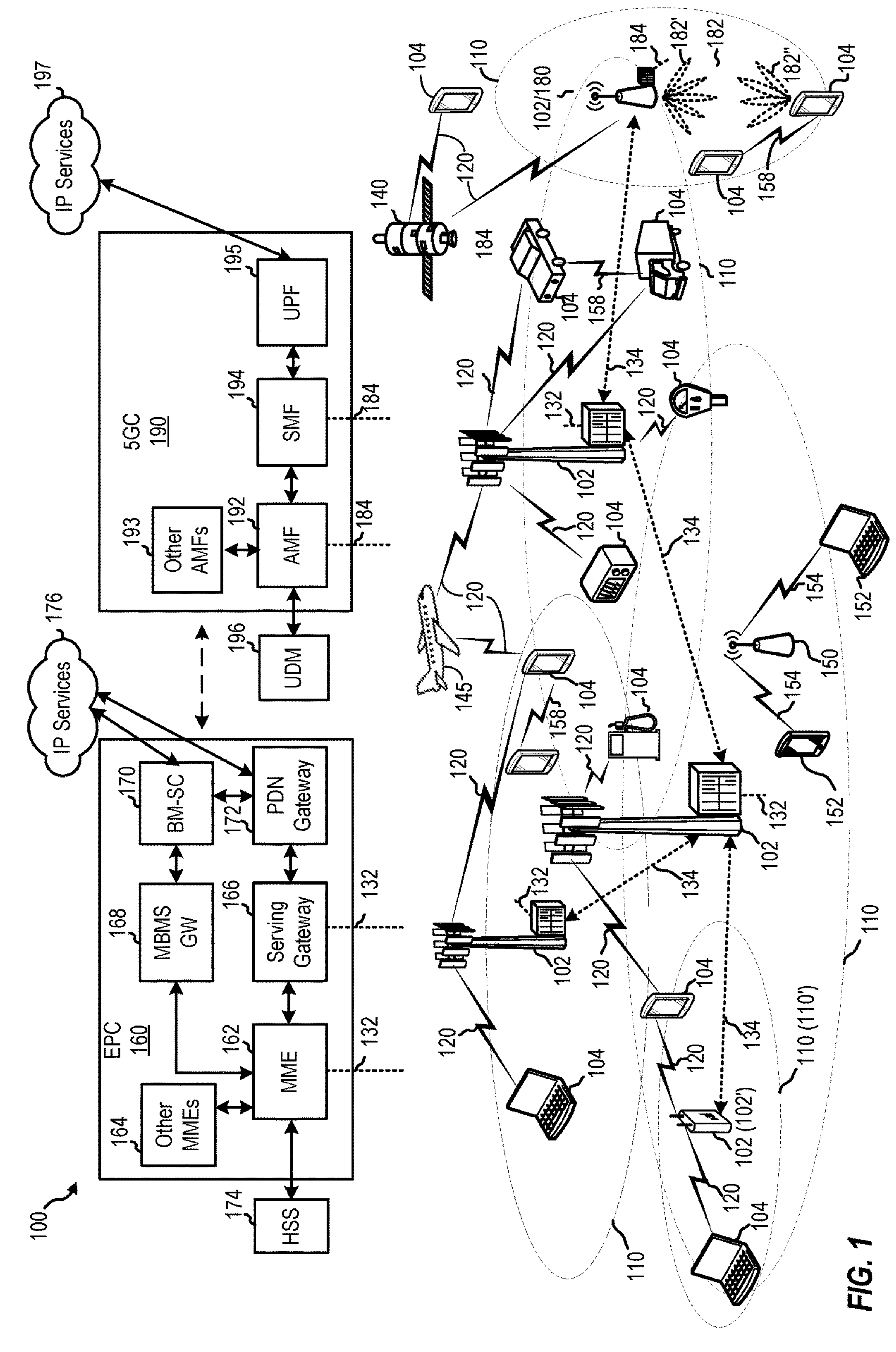
FIG. 1 depicts an example wireless communications network.

Aspects of the present disclosure relate to wireless communications, and more particularly, to techniques for adjusting transmission power based on unused transmission occasions.

Configured scheduling is a mechanism in which the network can schedule physical uplink shared channel (PUSCH) resources for a user equipment (UE). Configured scheduling for the uplink may be performed using a configured grant (CG). Uplink resources are scheduled via CGs that occur periodically (referred to as CG occasions) without the need for control signaling, eliminating expense and delay associated with dynamic signaling.

CG parameters are typically configured via radio resource control (RRC) signaling and the activation of the grant may be accomplished via RRC or L1 signaling. Typically, the periodicity and configured parameters (e.g., number of resource blocks (RBs), modulation and coding scheme (MCS), number of repetitions) are the same for all CG occasions in the CG configuration.

To more efficiently use resources, a UE may transmit uplink control information (UCI) that indicates unused (i.e., not to be used) CG PUSCH TOs to the network. These unused CG PUSCH TOs may be referred to as unused TOs (UTOs). Because a UE is not allowed to transmit PUSCH in an indicated UTO, based on the UTO information conveyed in the UCI, the network may better utilize the corresponding resources.

Transmission power control is typically controlled for uplink transmissions, such as PUSCH, physical uplink control channel (PUCCH), sounding reference signal (SRS), and physical random access channel (PRACH) transmission, in order to reduce intra-cell and inter-cell interference, as well as UE power consumption. Uplink power control for PUSCH is typically based on a general formula that determines PUSCH transmission power for a given PUSCH transmission occasion, subject to a configured maximum power.

In addition to the configured maximum power, the UE may apply a power backoff due to Maximum Permissible Exposure (MPE) considerations. The power backoff, referred to as a maximum power reduction (MPR), may be reported by the UE to the network in the PHR report. MPE requirements are typically determined by the UE on an average basis (over a number of transmission occasions). If the UE is going to exceed an average MPE, the UE applies a backoff to maintain the MPE requirement.

With the UL skipping feature described above, the UE knows that it will be skipping PUSCH transmissions for a future number of occasions (unused transmission occasions UTOs). Because there is no PUSCH transmission, the average power requirement will not be impacted by these skipped occasions. Unfortunately, the typical PUSCH transmission power control equation does not factor in UTOs.

Aspects of the present disclosure, however, propose mechanisms that may allow a UE to opportunistically increase its current PUSCH transmission power, by factoring in UTOs. Because MPE requirements are typically monitored on an average basis, this opportunistic increase in PUSCH transmission power may come without violating the MPE requirements.

Potential benefits of the opportunistic increase in transmission power proposed herein may include improved signal to interference and noise ratio (SINR) of the uplink transmission, which may enhance the detection probability and overall system performance. While a transmission power increase has the potential to create extra interference, this additional interference may be tolerated in many scenarios. For example, UEs which are at or near a cell coverage center or UEs with no close users operating in the same frequency may be able to increase uplink transmission power with little or no adverse impact due to interference.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
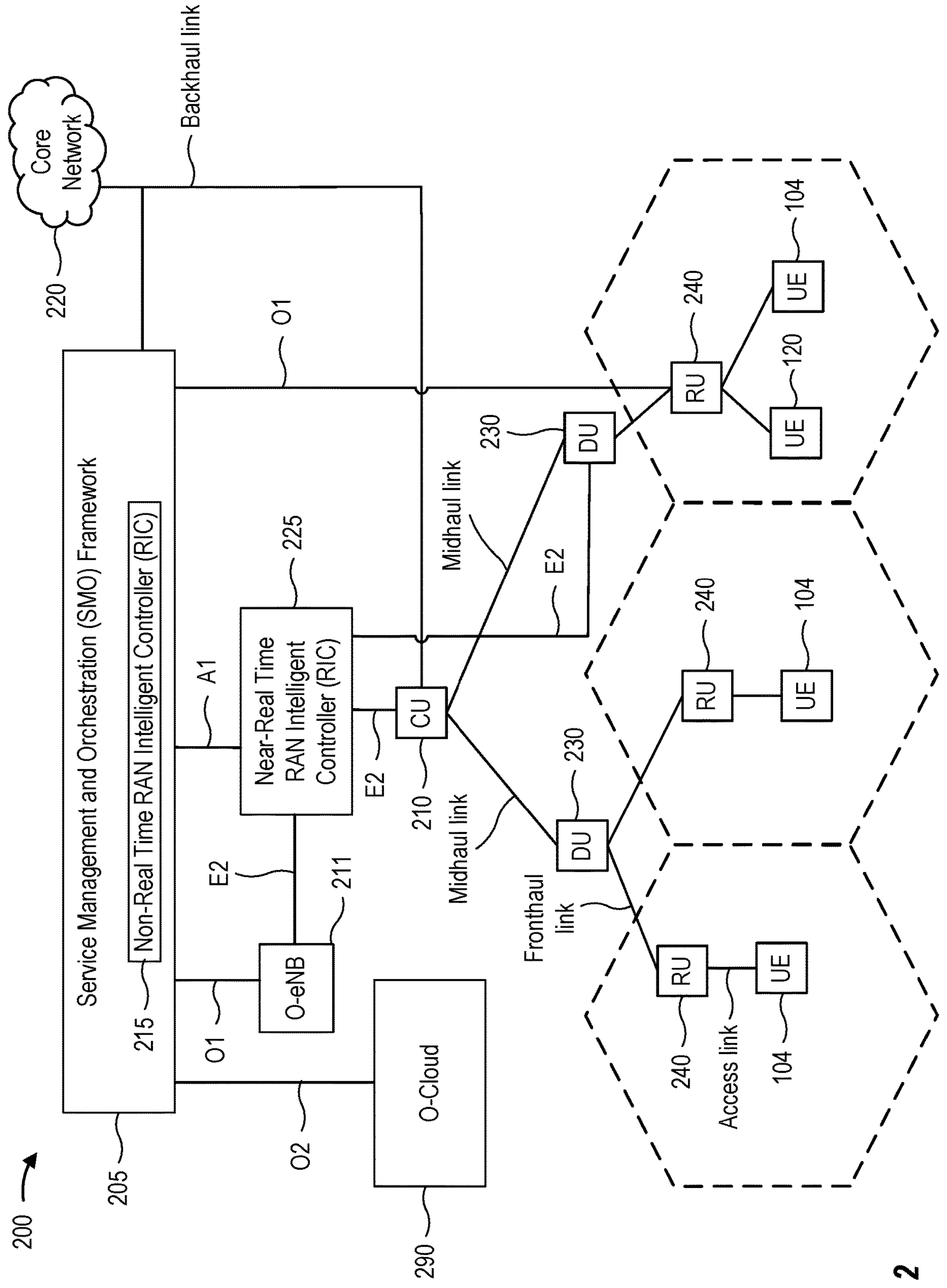
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHZ, which is sometimes referred to (interchangeably) as a "millimeter wave" ("mmW" or "mm Wave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mm Wave/near mm Wave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
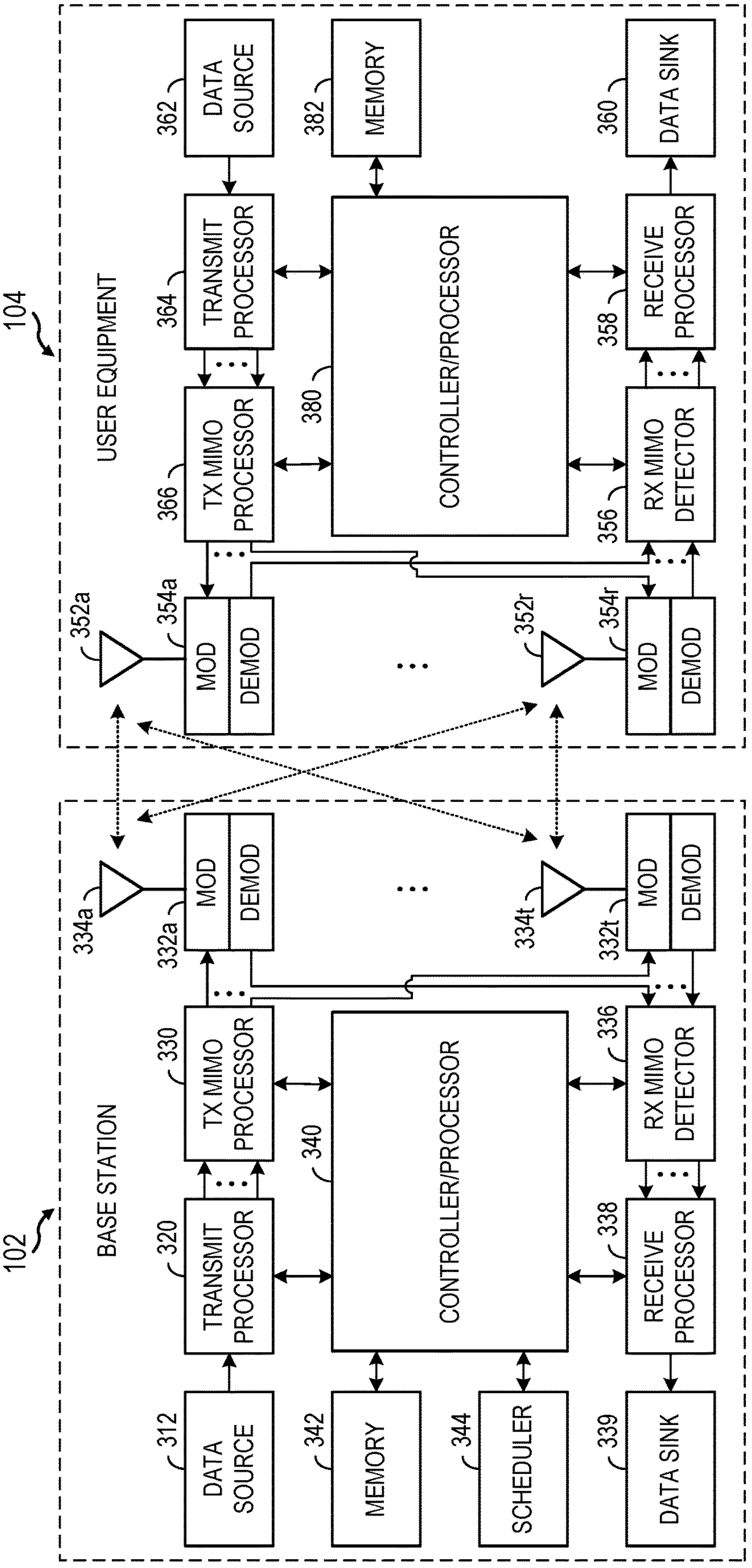
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, “transmitting” may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, “receiving” may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, “transmitting” may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, “receiving” may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, one or more processors may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
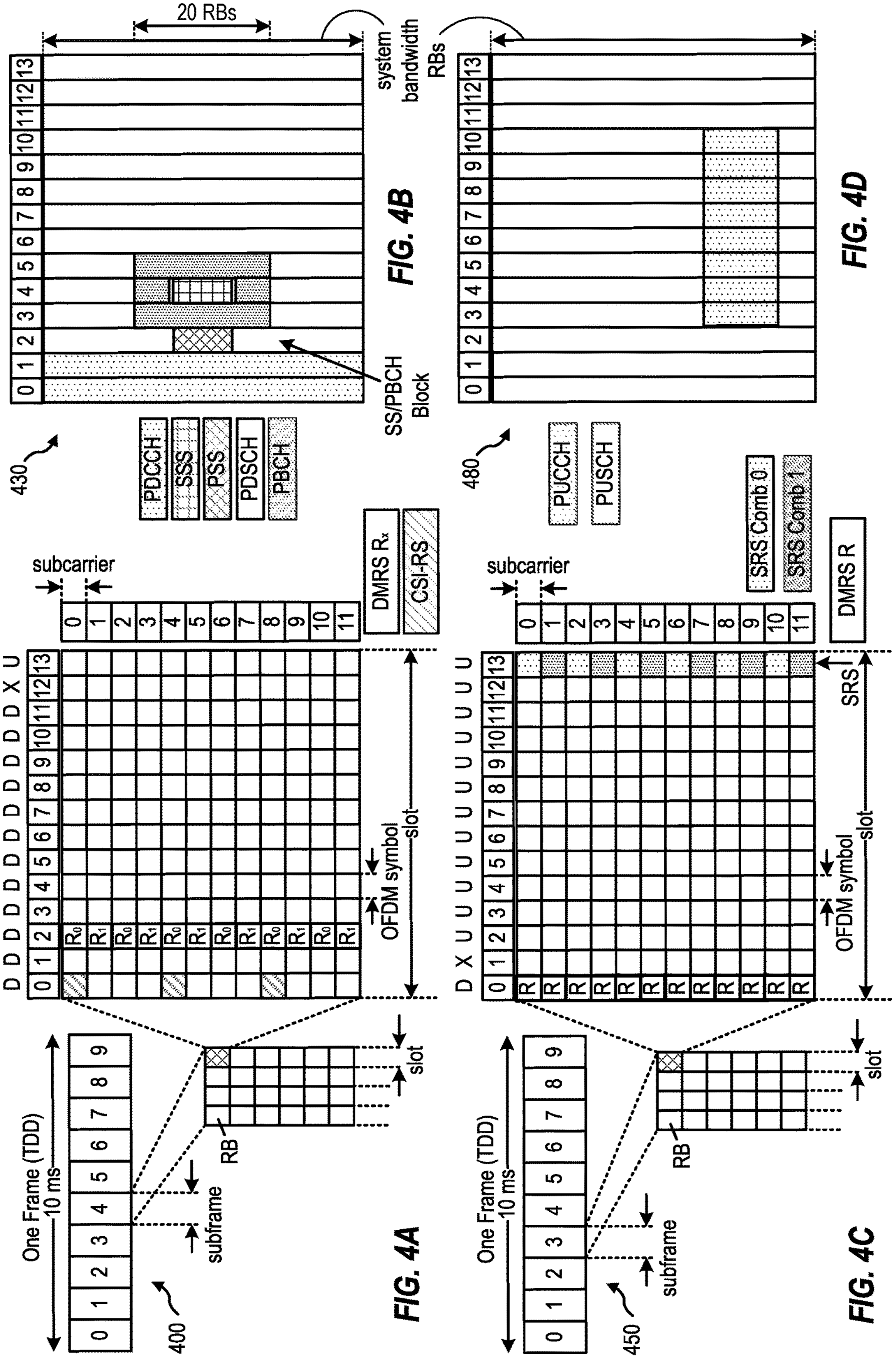
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to 24× 15 kHz, where μ is the numerology 0 to 6. As such, the numerology μ=0 has a subcarrier spacing of 15 kHz and the numerology μ=6 has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Resource Allocation Techniques

As noted above, radio resources can be allocated to a UE by configured scheduling, dynamic scheduling, or a combination of configured and dynamic scheduling.

Configured scheduling is a mechanism in which the network can schedule PUSCH resources for the UE without using DCI to schedule each PUSCH transmission. Configured scheduling is done by configuring the UE with the scheduling parameters semi-statically in RRC signaling. Configured scheduling helps reduce the scheduling overhead.

Figure 5:
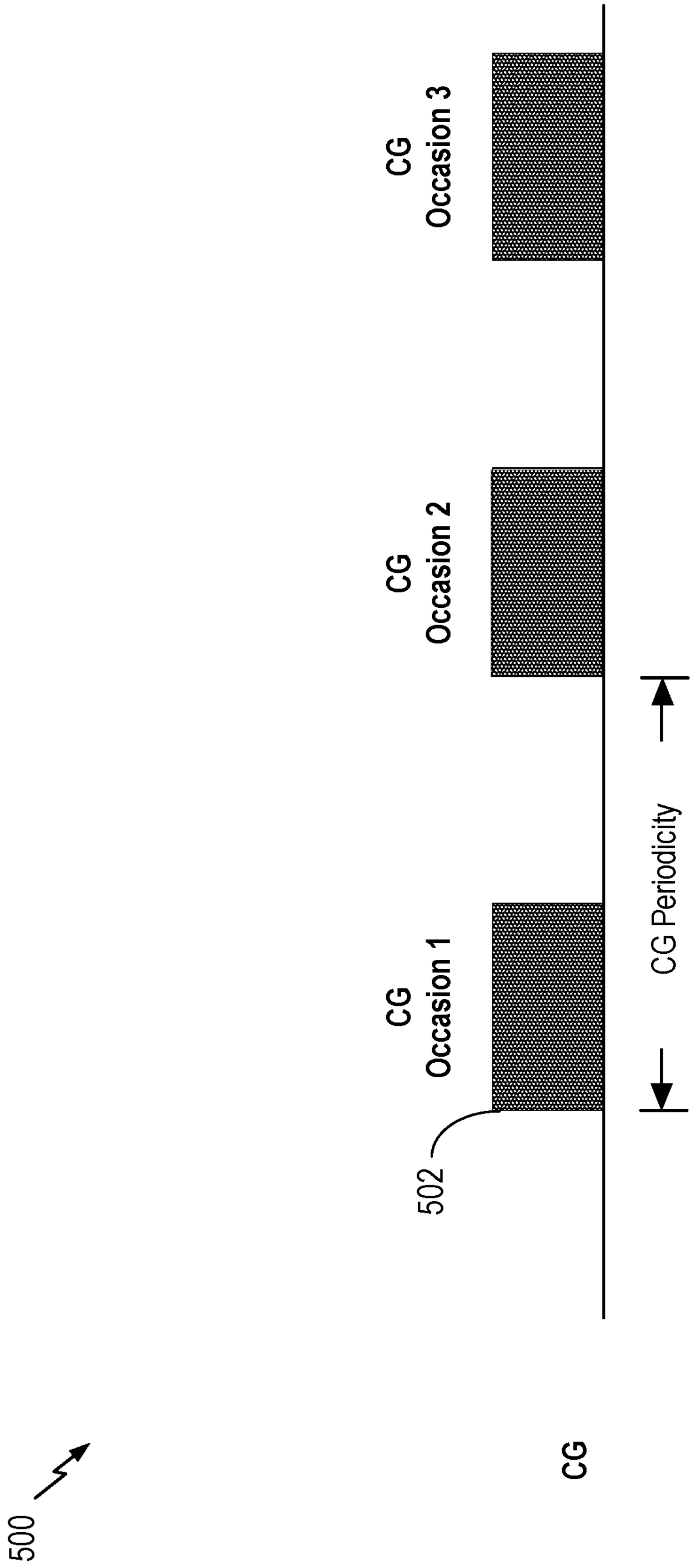
FIG. 5 depicts an example of configured grant (CG) transmission occasions (TOs).

Configured scheduling for the uplink may be performed using a configured grant (CG). FIG. 5 illustrates an example timeline 500 for CG scheduling, where uplink resources are scheduled via CGs that occur periodically (referred to as CG occasions 502) without the need for control signaling, eliminating expense and delay associated with dynamic signaling. CG parameters are typically configured via RRC signaling and the activation of the grant may be through RRC or L1 signaling. Typically, the periodicity and configured parameters (e.g., number of resource blocks (RBs), modulation and coding scheme (MCS), number of repetitions) are the same for all CG occasions in the CG configuration.

Two different types of configured grants include Type 1 CGs and Type 2 CGs. In Type 1 CG, the network send higher layer RRC signaling (e.g., an RRCSetup or RRCReconfiguration message according to 3GPP TS 38.331) configuring all the parameters for PUSCH scheduling including a resource allocation. The UE may transmit PUSCH according to configured scheduling, without receiving any lower layer trigger (e.g., DCI). In Type 2 CG, after the RRC configuration, the network sends a DCI (e.g., masked with a configured scheduling radio network temporary identifier (CS-RNTI)) to activate the configured grant. In both Type 1 CG and Type 2 CG, the network may send MAC CE signaling to downselect the RRC configured resources and/or DCI overwriting the configured scheduling. Because the configured scheduling is semi-static, the UE may be over-allocated with resources for uplink transmission, for example, due to changed channel conditions.

Figure 6A:
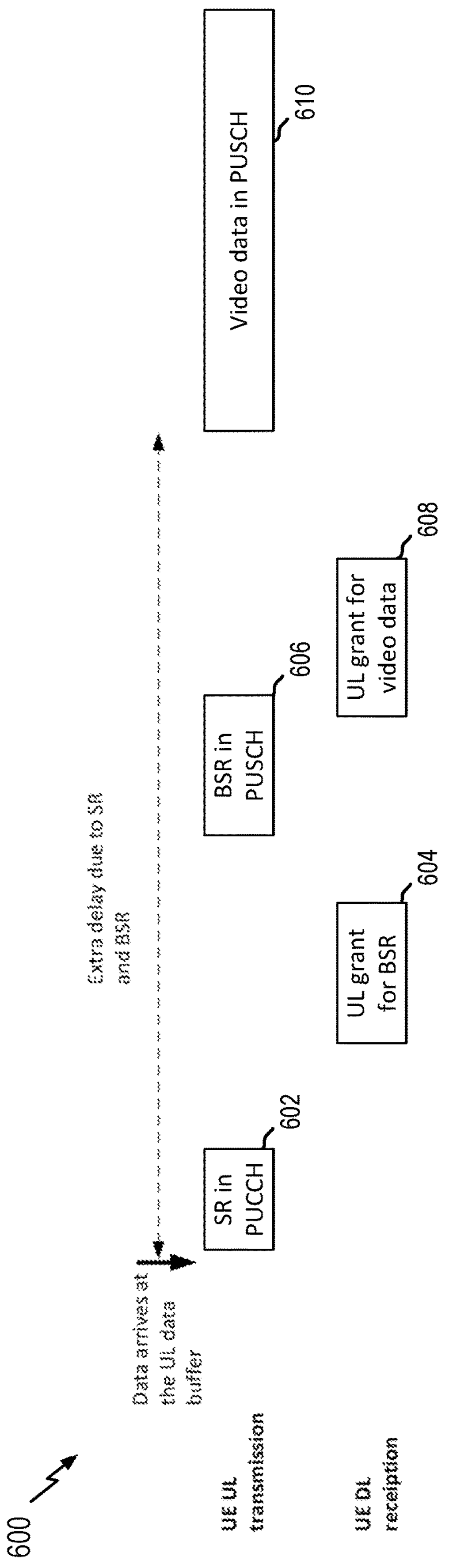
FIGS. 6A and 6B depict examples of dynamically scheduled and configured grant uplink transmissions, respectively.

As illustrated in diagram 600 of FIG. 6A, for dynamic grants, the network may send DCI to schedule each uplink transmission for the UE. In some cases, the network schedules uplink resources for the UE based on buffer status reports (BSRs) received from the UE. However, if a BSR accurately reflecting the UEs buffer size is not recently received, the network may still overallocate resources for the UE. In addition, a BSR codepoint can correspond to a large range (e.g., 7-8 MB). In addition, a UE may first send a scheduling request (SR), as indicated at 602, for resources to send the BSR (at 606). SR and BSR transmission, and waiting for an uplink grant, may increase uplink latency at the UE, as the UE may wait for an uplink grant for the BSR (604) after sending the SR and may also wait for an uplink grant (608) for the data transmission (610).

As noted above, when a UE is configured with CG PUSCH the UE may transmit uplink control information (UCI) that indicates unused (i.e., not to be used) CG PUSCH TOs to the network. As noted above, these unused CG PUSCH TOs may be referred to as unused TOs (UTOs).

The UTO-UCI mechanism may be useful to address scenarios of high data rate traffic with large and random packet size, as well as stringent latency requirements. For this type of traffic, a network may configure multiple CG PUSCH TOs within each data generation cycle of UL traffic based on the maximum packet size generated in each data cycle.

Figure 6B:
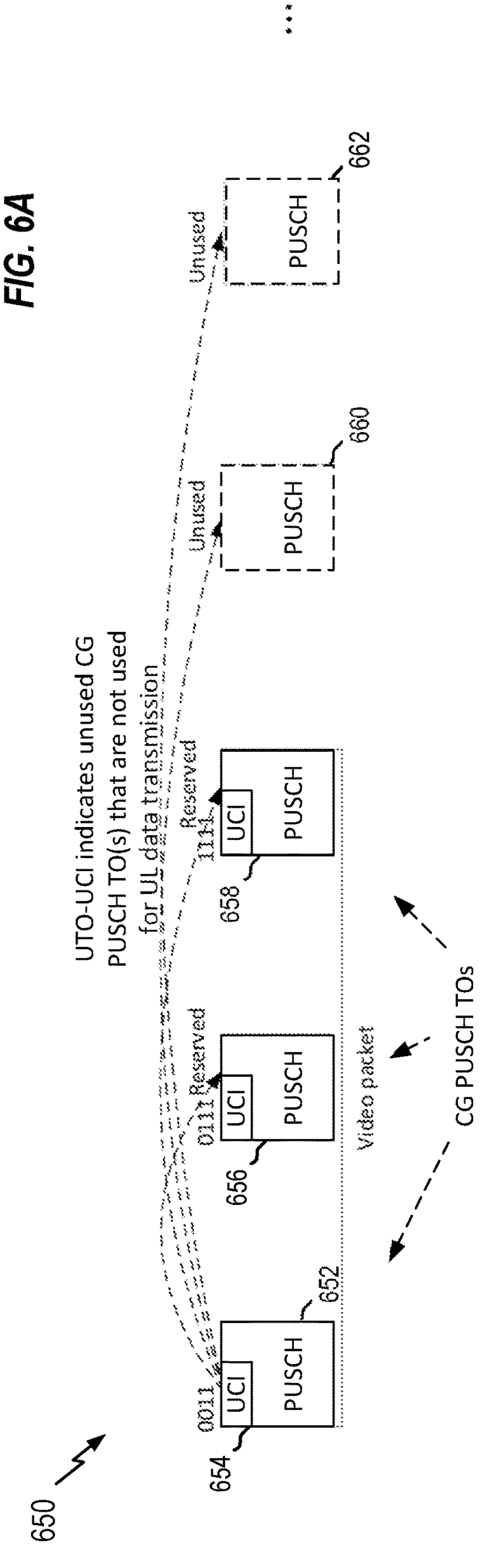

An example of UTO-UCI signaling is indicated in diagram 650 of FIG. 6B. As illustrated, a UE may immediately begin transmitting PUSCHs 652 on the CG PUSCH TOs when data arrives in the UL data buffer. As indicate, the UE may indicate unused CG PUSCH TOs (e.g., UTOs 660 and 662) that are not used for UL data transmission via a UTO-UCI (654, 656, and 658) so that network can reallocate these resources to other UEs, this enhances the overall system throughput.

This UTO-UCI procedure may help avoid latency loss caused by scheduling request (SR) and buffer status report (BSR) based resource request, described above with reference to FIG. 6A, while avoiding wasted UL resources that are over-allocated to the UE. The network may configure a UE to send UTO-UCI for a given CG configuration, in every transmitted PUSCH of the CG.

Figure 7:
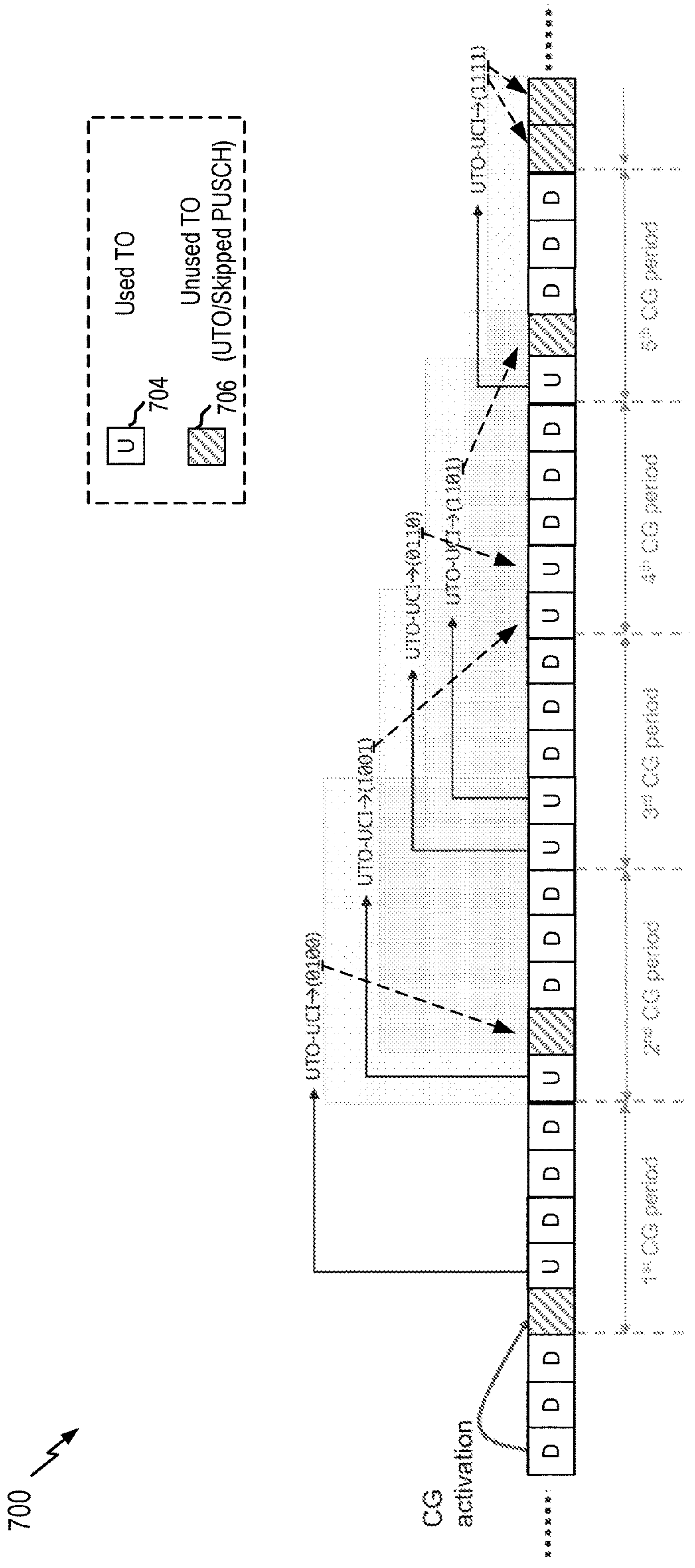
FIG. 7 depicts an example of unused transmission occasion (UTO) uplink control information (UCI) signaling.

For example, as illustrated in diagram 700 of FIG. 7, each UTO-UCI may convey a bitmap with certain bit values indicating one or more upcoming CG PUSCH TOs that will be skipped (UTOs). In some cases, an RRC parameter (Nu) may indicate the size of bit-map (e.g., with a value range from 3 to 8).

As illustrated, after CG activation (via a downlink transmission at 702), each PUSCH transmission (in a used UTO 704) may convey UTO-UCI that is applicable to Nu consecutive and valid CG PUSCH TOs, starting with UTO_offset from the end of the transmitted CG PUSCH. A bit value of "0" may indicate a used TO 704, while a bit value of "1" may indicate a UTO 706.

In the illustrated example, a 4-bit bitmap is used (e.g., Nu=4) and interpretation of the bitmap may be understood with reference to the first few UTO-UCIs. For example, a first UTO-UCI carrying a bitmap of "0100" indicates that the UE intends to [not skip/skip/not skip/not skip] the next four CG-PUSCH occasions. The next UTO-UCI carrying a bitmap of "1001" indicates that the UE intends to [skip/not skip/not skip/skip] the next four CG-PUSCH occasions (with the first "1" indicating the same UTO as the "1" in the previous UTO-UCI bitmap "0100").

Aspects Related to UTO Enabled Transmission Power Increase

Aspects of the present disclosure provide techniques that may allow a UE to opportunistically increase transmission power based on unused transmission occasions.

As noted above, uplink power control for PUSCH is typically based on a general formula that determines PUSCH transmission power for a given PUSCH transmission occasion, subject to a configured maximum power. In addition to the configured maximum power, the UE may apply a power backoff due to MPE considerations. The power backoff, referred to as a maximum power reduction (MPR), may be reported by the UE to the network in the PHR report.

As noted above, MPE requirements are typically determined by the UE on an average basis over a number of transmission occasions. If the UE is going to exceed an average MPE, the UE applies a backoff to maintain the MPE requirement. With the UL skipping feature described above, the UE knows that it will be skipping PUSCH transmissions for a future number of occasions (UTOs). Because there is no PUSCH transmission, the average power requirement will not be impacted by these skipped occasions.

Aspects of the present disclosure, however, propose mechanisms that may allow a UE to opportunistically increase its current PUSCH transmission power, by factoring in UTOs. Because MPE requirements are typically monitored on an average basis, this opportunistic increase in PUSCH transmission power may come without violating the MPE requirements.

Figure 8:
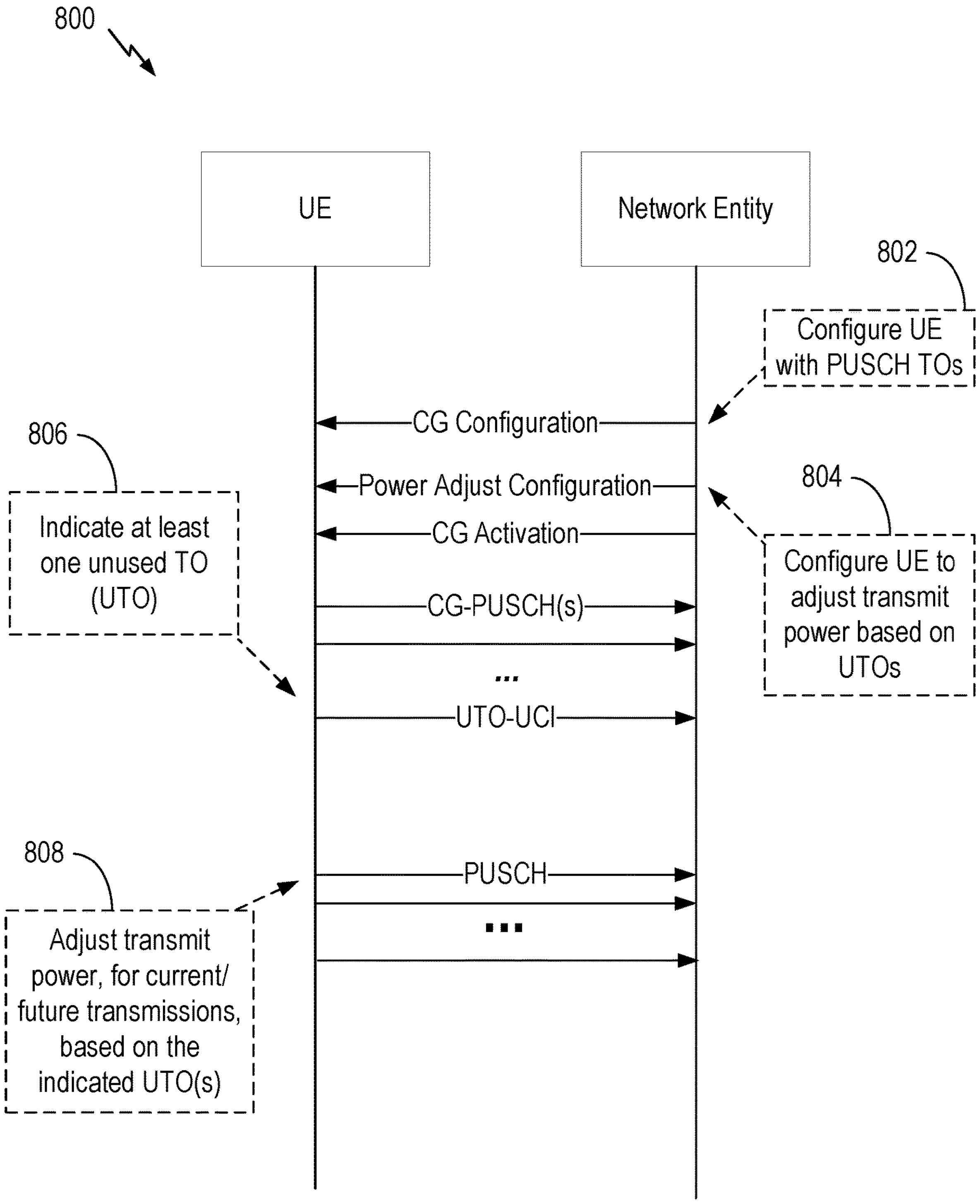
FIG. 8 depicts a call flow diagram illustrating enhanced HD communications, in accordance with certain aspects of the present disclosure.

UTO-enabled transmission power adjustment proposed herein may be understood with reference to call flow diagram 800 of FIG. 8. In some aspects, the network entity shown in FIG. 8 may be an example of the BS depicted and described with respect to FIGS. 1 and 3 or a disaggregated base station depicted and described with respect to FIG. 2. Similarly, the UE shown in FIG. 8 may be an example of UE 104 depicted and described with respect to FIGS. 1 and 3. However, in other aspects, UE 104 may be another type of wireless communications device and BS 102 may be another type of network entity or network node, such as those described herein.

As illustrated at 802, the network entity may configure the UE with one or more CG configurations that configure the UE with PUSCH TOs. While PUSCH TOs are used as an illustrative example, the techniques proposed herein could also be used in other types of configured TOs.

In some cases, as illustrated at 804, the network may also configure the UE to adjust transmit power based on UTOs. For example, the network may configure the UE to adjust transmit power based on UTOs on a per band basis, a per bandwidth part (BWP) basis, a per configured grant (CG) basis, and/or a per beam basis.

The network entity may activate (or reactivate) one or more CG configurations. In some cases, CG configurations may be jointly activated via a same RRC message (e.g., for type 1 CG) or via DCI (e.g., for type 2 CG). In the case of CG type 2, the network may send a single DCI indicating the CG configuration indices (individual indices) or indicating group ID of the group.

As illustrated at 806, the UE may transmit signaling (e.g., via a UTO-UCI in a transmitted CG PUSCH) indicating at least one UTO. For example, the indication may be via a UTO-UCI with a bitmap, as described with reference to FIG. 7.

As indicated at 808, the UE may adjust transmit power, for one or more current/future transmissions, based on the indicated UTO(s). For example, the UE may increase transmit power for one or more PUSCH transmissions, based on the fact that PUSCH will not be transmitted in the UTO(s) indicated in the UTO-UCI.

According to certain aspects, a UE may utilize a power control formula that considers skipped transmission occasions and that no transmissions occur therein. For example, the UE may utilize a formula for PUSCH power control that allows the increase of current PUSCH transmission power as a function of the skipped (i.e., unused) future transmission occasions (UTOs).

Such power control formula may have one or more parameters whose value is determined by UTOs. One example of such a formula for PUSCH transmission occasion i, on an active UL BWP b of carrier f of serving cell c, using a parameter set with index j and a PUSCH power control adjustment state with index/is:

$$P_{PUSCH,b,f,c}(i,\ j,\ q_d,\ l) =$$

$$\Big(P_{CMAX,f,c}(i),\ \min\ P_{O_{PUSCH},b,f,c}(j) + 10\ \log_{10}\big(2^{\mu} M^{PUSCH}_{RB,b,f,c}(i)\big) +$$

$$\alpha_{b,f,c}(j)\cdot PL_{b,f,c}(q_d) + \Delta_{TF,f,b,c}(i) + f_{b,f,c}(i,\ l) + \Delta_{UTO}(i)\Big),$$

where $P_{CMAX}$ is a UE configured maximum output power, $P_0$ is a pre-configured received power target assuming full pathloss compensation, α is a fractional power control factor, and is a closed loop power control component which allows a network entity (e.g., base station) to adjust the transmit power at a UE, based on a transmit power control (TPC) command conveyed via DCI in a PDCCH. The fractional power control factor α has a value between 0 and 1, where 0 means no pathloss compensation (and all UEs transmit at the same power) and 1 means full pathloss compensation (which tries to achieve the same received power from all UEs). In this formula, the new term $\Delta_{UTO}$(i) reflects the dependence of the current transmission power on the future skipped indication, which is indicated in the current UTO-DCI multiplexed with the PUSCH In this formula, a new term $\Delta_{UTO}$(i) reflects the dependence of the current transmission power on the future skipped transmission indication, which is indicated in the current UTO-DCI multiplexed with the PUSCH. As noted above, the UTO-UCI may be specified to be conveyed as a bitmap of size Nu (e.g., between 3 and 8 bits).

According to certain aspects, $\Delta_{UTO}$(i) may be computed as function of the UTO-UCI content. For example, in some cases, this term is positive ($\Delta_{UTO}(i)>0$) only if the number of skipped occasions is greater than some minimum value (#UTOs≥$Nu_{min}$).

According to certain aspects, there may also be a time window constraint specified to enable the power boosting possibility (e.g., $\Delta_{UTO}(i)>0$). For example, the time window constraint may enable power boosting only if the number of skipped occasions is ≥$Nu_{min}$ and a time window from the 1st skipped occasion to the last skipped occasion ≥$T_{Nu_{min}}$.

The value of $\Delta_{UTO}$(i) may be determined according to various options. For example, according to a first option:

$$\Delta_{UTO}(i)=K,$$

where K is specified in the specs, or broadcast in a SIB. According to a second option:

$$\Delta_{UTO}(i)=K,$$

where K is configured to the UE by RRC, MAC-CE or DCI. According to a third option, the value of $\Delta_{UTO}$(i) may be determined as a function of the UTO-UCI:

$$\Delta_{UTO}(i)=f(\text{UTO-UCI}).$$

One example of such a function is:

$$\Delta_{UTO}(i) = Nu_{min} * K,$$

where K can be specified (signaled/configured) as noted in the previous options. As an alternative to the function above, a more complicated function can be specified in the standard which could be a function of the inter-occasions durations (e.g., time durations between used/unused TOs) and the content of UTO-UCI.

According to a fourth option, a budget interval may be configured to the UE, such that the UE chooses a value from this budget. According to this option, a minimum value and a maximum value may be specified for $\Delta_{UTO}$(i). In some cases, in the absence of configuration, the minimum value may be set to 0 and the maximum value may be set to $P_{CMAX,f,c}$(i). This option may be practical as a UE keeps track of its MPE requirement and can, thus, determine an appropriate power increase without violating its MPE requirement.

According to certain aspects, if the UE determines the value of $\Delta_{UTO}$(i), the network (e.g., gNB) may configure the UE to report the value of $\Delta_{UTO}$(i) in a power headroom report (PHR).

According to certain aspects, opportunistic transmit power increase functionality by the UE proposed herein may be enabled under certain conditions and/or with certain applicability. For example, UTO-UCI-enabled transmit power increases may be allowed under any combination of the following bases: per band, per BWP, or per CG. In some cases, UTO-UCI-enabled transmit power increases may be activated and/or deactivated via RRC, MAC-CE, or DCI signaling.

According to certain aspects, UTO-UCI-enabled transmit power increases may be allowed per beam. For example, per-beam transmit power increases may be enabled through transmission configuration indicator (TCI) and/or quasi co-location (QCL) restrictions.

According to certain aspects, UTO-UCI-enabled transmit power increases may be allowed with geographic/location restrictions for a UE. For example, UTO-UCI-enabled transmit power increases may be allowed for UEs close to the cell center that may have reduced chance of adversely impacting other UEs due to interference. In some cases, geographic/location restrictions may be satisfied by a setting (e.g., a requirements on certain thresholds for) a configured fractional pathloss coefficient $\alpha_{b,f,c}(j)$. For example, if $\alpha_{b,f,c}(j) \leq \kappa$, or if $\alpha_{b,f,c}(j) \geq \eta$, then a UTO-UCI-enabled power increase may be enabled. In such cases, the values of $\kappa$, $\eta$ may be configured to the UE (UE-specific) or broadcast.

According to certain aspects, in addition to (or instead of) an additive term (e.g., $\Delta_{UTO}(i)$), the UL power control of a UL configured grant may be adapted based on $P_0$ and $\alpha$ values. In the current systems, $P_0$ and $\alpha$ are RRC configured and are a function of the UL transmission beam in the form of an SRS resource indicator (SRI) indication. Aspects of the present disclosure, however, may add another dimensionality based on the number of skipped occasions. Thus, for each SRI indication and UTO information, there may be a combination of $P_0$ and $\alpha$ values that are RRC configured. In other words, given a certain SRI indication and UTO-UCI, the UE may be able to determine the particular values for $P_0$ and $\alpha$ (from the RRC configured combinations).

Example Operations

Figure 9:
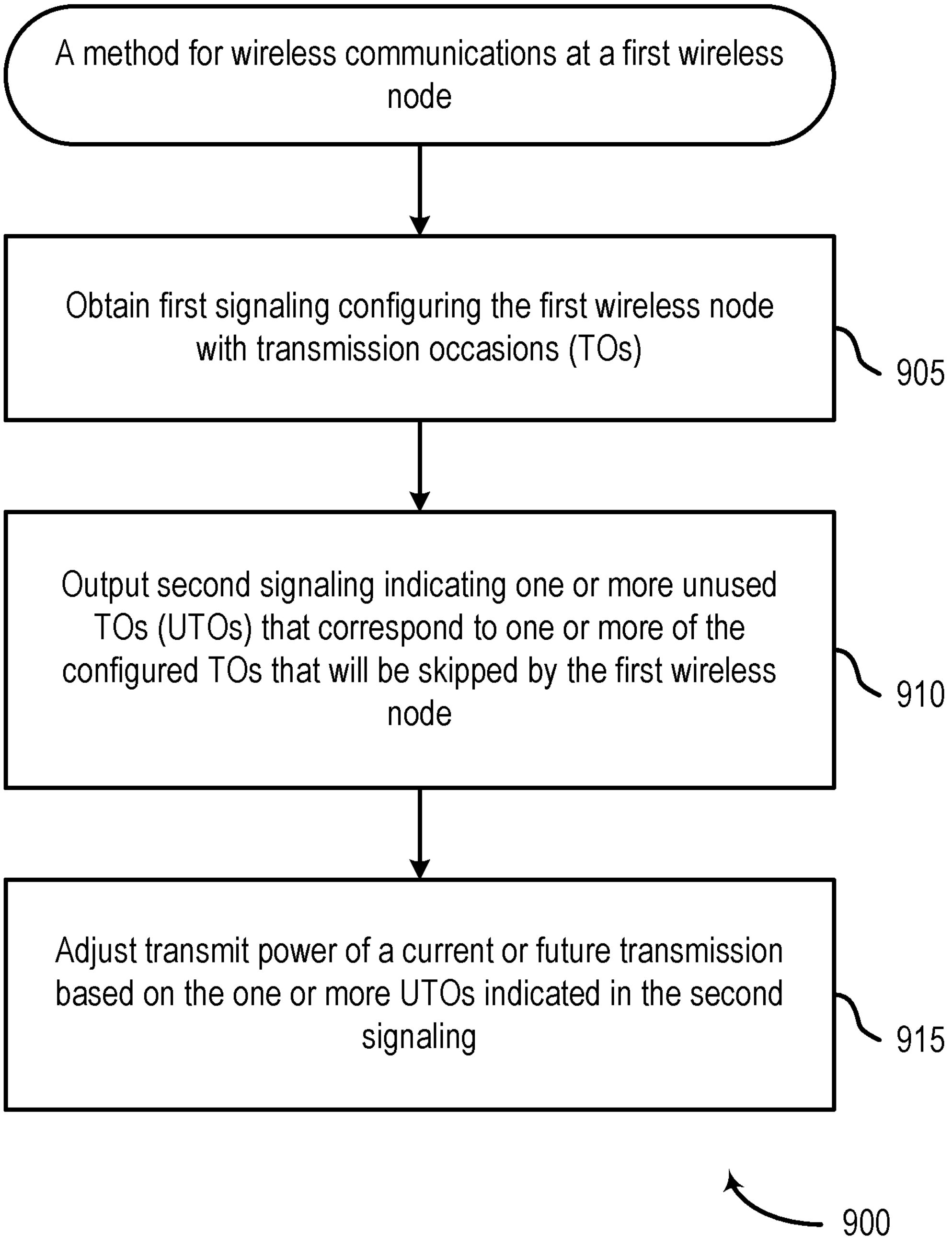
FIG. 9 depicts a method for wireless communications.

FIG. 9 shows an example of a method 900 of wireless communications at a first wireless node, such as a UE 104 of FIGS. 1 and 3.

Method 900 begins at step 905 with obtaining first signaling configuring the first wireless node with transmission occasions (TOs). In some cases, the operations of this step refer to, or may be performed by, circuitry for obtaining and/or code for obtaining as described with reference to FIG. 11.

Method 900 then proceeds to step 910 with outputting second signaling indicating one or more unused TOs (UTOs) that correspond to one or more of the configured TOs that will be skipped by the first wireless node. In some cases, the operations of this step refer to, or may be performed by, circuitry for outputting and/or code for outputting as described with reference to FIG. 11.

Method 900 then proceeds to step 915 with adjusting transmit power of a current or future transmission based on the one or more UTOs indicated in the second signaling. In some cases, the operations of this step refer to, or may be performed by, circuitry for adjusting and/or code for adjusting as described with reference to FIG. 11.

In some aspects, the TOs are for transmitting a physical uplink shared channel (PUSCH); and the adjustment comprises increasing transmit power of a current or future PUSCH transmission.

In some aspects, the increase is based on a formula for PUSCH power control that increases PUSCH transmission power as a function of the one or more UTOs indicated in the second signaling.

In some aspects, the formula includes at least one parameter whose value depends on the one or more UTOs indicated in the second signaling.

In some aspects, the at least one parameter comprises a closed loop power control parameter that depends on the one or more UTOs indicated in the second signaling.

In some aspects, the closed loop power control parameter is a value greater than zero only if one or more conditions are met.

In some aspects, the one or more conditions are met if at least one of: a quantity of the UTOs indicated in the second signaling is greater than or equal to a threshold quantity; or a time window from a first of the one or more UTOs to a last of the one or more UTOs is greater than a threshold time duration.

In some aspects, a value of the closed loop power control parameter is based on at least one of: broadcast signaling; radio resource control (RRC), medium access control (MAC) control element (CE), or downlink control information (DCI) signaling; or control information conveyed via the second signaling.

In some aspects, a value of the closed loop power control parameter is based on at least one of a defined value or a defined function.

In some aspects, a value of the closed loop power control parameter is based on a budget interval defined by a minimum value and a maximum value.

In some aspects, the method 900 further includes providing a value of the closed loop power control parameter in a power headroom report (PHR). In some cases, the operations of this step refer to, or may be performed by, circuitry for providing and/or code for providing as described with reference to FIG. 11.

In some aspects, the method 900 further includes obtaining third signaling configuring the first wireless node for the adjustment of the transmit power on at least one of: a per band basis, a per bandwidth part (BWP) basis, a per configured grant (CG) basis, or a per beam basis. In some cases, the operations of this step refer to, or may be performed by, circuitry for obtaining and/or code for obtaining as described with reference to FIG. 11.

In some aspects, the adjustment of the transmit power is triggered based on a location of the first wireless node.

In some aspects, the adjustment is based on a formula that includes at least one parameter whose value depends on the one or more UTOs indicated in the second signaling; and the at least one parameter comprises at least one of a first parameter that indicates a received power target or a second parameter that indicates a fractional power control factor.

In some aspects, wherein the at least one parameter comprises both the first parameter and the second parameter; and values of the first and second parameters are based on the one or more UTOs indicated in the second signaling and a sounding reference signal (SRS) resource indicator (SRI) value.

Figure 11:
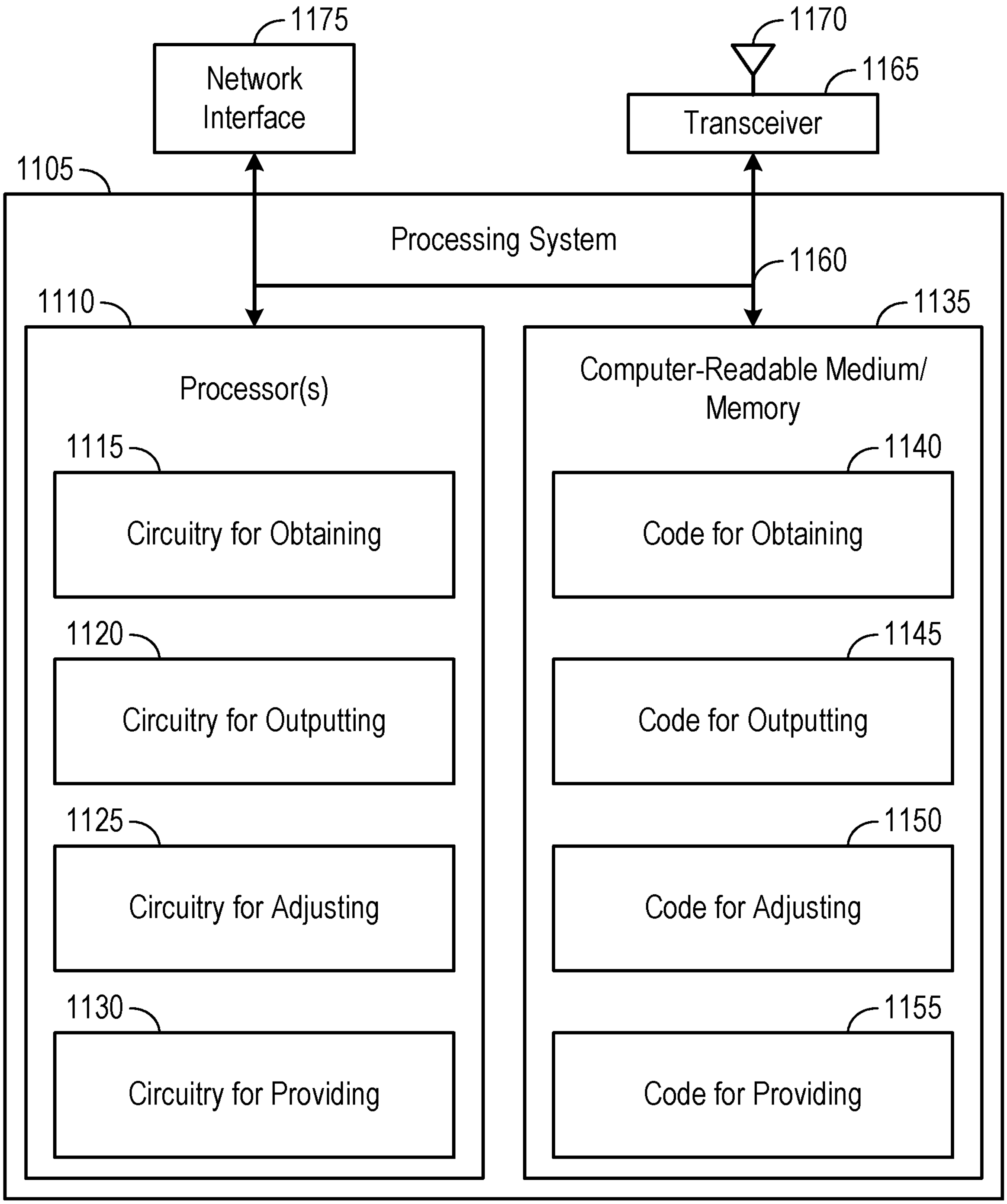
FIG. 11 depicts aspects of an example communications device.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Figure 10:
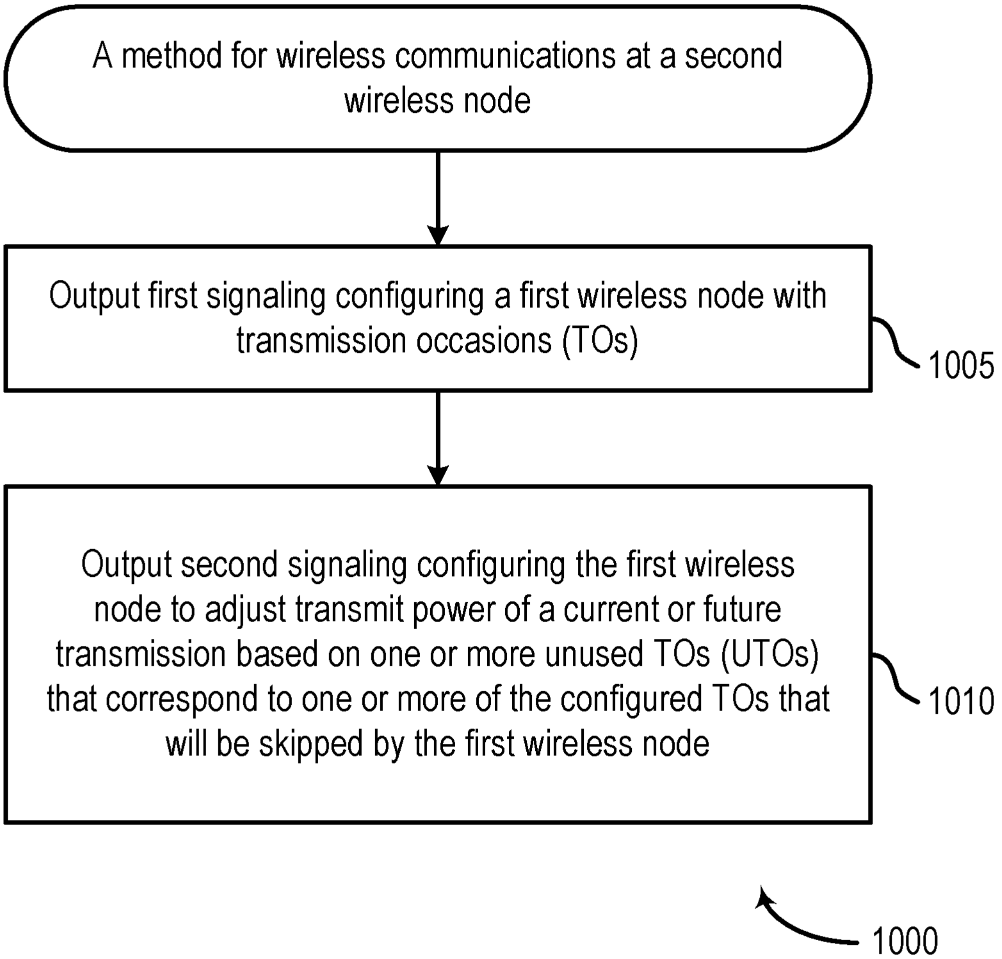
FIG. 10 depicts a method for wireless communications.

FIG. 10 shows an example of a method 1000 of wireless communications at a second wireless node, such as a BS 102 of FIGS. 1 and 3, or a disaggregated base station as discussed with respect to FIG. 2.

Method 1000 begins at step 1005 with outputting first signaling configuring a first wireless node with transmission occasions (TOs). In some cases, the operations of this step refer to, or may be performed by, circuitry for outputting and/or code for outputting as described with reference to FIG. 11.

Method 1000 then proceeds to step 1010 with outputting second signaling configuring the first wireless node to adjust transmit power of a current or future transmission based on one or more unused TOs (UTOs) that correspond to one or more of the configured TOs that will be skipped by the first wireless node. In some cases, the operations of this step refer to, or may be performed by, circuitry for outputting and/or code for outputting as described with reference to FIG. 11.

In some aspects, the TOs are for transmitting a physical uplink shared channel (PUSCH).

In some aspects, the method 1000 further includes obtaining third signaling indicating the one or more UTOs, wherein the adjustment is based on a formula for PUSCH power control that increases PUSCH transmission power as a function of the one or more UTOs indicated in the second signaling. In some cases, the operations of this step refer to, or may be performed by, circuitry for obtaining and/or code for obtaining as described with reference to FIG. 11.

In some aspects, the formula includes at least one parameter whose value depends on the one or more UTOs indicated in the second signaling.

In some aspects, the at least one parameter comprises a closed loop power control parameter that depends on the one or more UTOs indicated in the third signaling.

In some aspects, the closed loop power control parameter is a value greater than zero only if one or more conditions are met; and the second signaling indicates information regarding the one or more conditions.

In some aspects, the one or more conditions are met if at least one of: a quantity of the UTOs indicated in the second signaling is greater than or equal to a threshold quantity; or a time window from a first of the one or more UTOs to a last of the one or more UTOs is greater than a threshold time duration, wherein the second signaling indicates at least one of the threshold quantity or the threshold time duration.

In some aspects, a value of the closed loop power control parameter is based on the second signaling; and the second signaling comprise at least one of: broadcast signaling; or radio resource control (RRC), medium access control (MAC) control element (CE), or downlink control information (DCI) signaling.

In some aspects, the method 1000 further includes obtaining a value of the closed loop power control parameter in a power headroom report (PHR) from the first wireless node. In some cases, the operations of this step refer to, or may be performed by, circuitry for obtaining and/or code for obtaining as described with reference to FIG. 11.

In some aspects, the second signaling configures the first wireless node for the adjustment of the transmit power on at least one of: a per band basis, a per bandwidth part (BWP) basis, a per configured grant (CG) basis, or a per beam basis.

In one aspect, method 1000, or any aspect related to it, may be performed by an apparatus, such as communications device 1100 of FIG. 11, which includes various components operable, configured, or adapted to perform the method 1000. Communications device 1100 is described below in further detail.

Note that FIG. 10 is just one example of a method, and other methods including fewer, additional, or alternative steps are possible consistent with this disclosure.

Example Communications Device(s)

FIG. 11 depicts aspects of an example communications device 1100. In some aspects, communications device 1100 is a user equipment, such as UE 104 described above with respect to FIGS. 1 and 3. In some aspects, communications device 1100 is a network entity, such as BS 102 of FIGS. 1 and 3, or a disaggregated base station as discussed with respect to FIG. 2.

The communications device 1100 includes a processing system 1105 coupled to the transceiver 1165 (e.g., a transmitter and/or a receiver). In some aspects (e.g., when communications device 1100 is a network entity), processing system 1105 may be coupled to a network interface 1175 that is configured to obtain and send signals for the communications device 1100 via communication link(s), such as a backhaul link, midhaul link, and/or fronthaul link as described herein, such as with respect to FIG. 2. The transceiver 1165 is configured to transmit and receive signals for the communications device 1100 via the antenna 1170, such as the various signals as described herein. The processing system 1105 may be configured to perform processing functions for the communications device 1100, including processing signals received and/or to be transmitted by the communications device 1100.

The processing system 1105 includes one or more processors 1110. In various aspects, the one or more processors 1110 may be representative of one or more of receive processor 358, transmit processor 364, TX MIMO processor 366, and/or controller/processor 380, as described with respect to FIG. 3. In various aspects, one or more processors 1110 may be representative of one or more of receive processor 338, transmit processor 320, TX MIMO processor 330, and/or controller/processor 340, as described with respect to FIG. 3. The one or more processors 1110 are coupled to a computer-readable medium/memory 1135 via a bus 1160. In certain aspects, the computer-readable medium/memory 1135 is configured to store instructions (e.g., computer-executable code) that when executed by the one or more processors 1110, cause the one or more processors 1110 to perform the method 900 described with respect to FIG. 9, or any aspect related to it; and the method 1000 described with respect to FIG. 10, or any aspect related to it. Note that reference to a processor performing a function of communications device 1100 may include one or more processors 1110 performing that function of communications device 1100.

In the depicted example, computer-readable medium/memory 1135 stores code (e.g., executable instructions), such as code for obtaining 1140, code for outputting 1145, code for adjusting 1150, and code for providing 1155. Processing of the code for obtaining 1140, code for outputting 1145, code for adjusting 1150, and code for providing 1155 may cause the communications device 1100 to perform the method 900 described with respect to FIG. 9, or any aspect related to it; and the method 1000 described with respect to FIG. 10, or any aspect related to it.

The one or more processors 1110 include circuitry configured to implement (e.g., execute) the code stored in the computer-readable medium/memory 1135, including circuitry for obtaining 1115, circuitry for outputting 1120, circuitry for adjusting 1125, and circuitry for providing 1130. Processing with circuitry for obtaining 1115, circuitry for outputting 1120, circuitry for adjusting 1125, and circuitry for providing 1130 may cause the communications device 1100 to perform the method 900 described with respect to FIG. 9, or any aspect related to it; and the method 1000 described with respect to FIG. 10, or any aspect related to it.

Various components of the communications device 1100 may provide means for performing the method 900 described with respect to FIG. 9, or any aspect related to it; and the method 1000 described with respect to FIG. 10, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1165 and the antenna 1170 of the communications device 1100 in FIG. 11. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1165 and the antenna 1170 of the communications device 1100 in FIG. 11.

Example Clauses

Implementation examples are described in the following numbered clauses:

Clause 1: A method for wireless communications at a first wireless node, comprising: obtaining first signaling configuring the first wireless node with transmission occasions (TOs); outputting second signaling indicating one or more unused TOs (UTOs) that correspond to one or more of the configured TOs that will be skipped by the first wireless node; and adjusting transmit power of a current or future transmission based on the one or more UTOs indicated in the second signaling.

Clause 2: The method of Clause 1, wherein: the TOs are for transmitting a physical uplink shared channel (PUSCH); and the adjustment comprises increasing transmit power of a current or future PUSCH transmission.

Clause 3: The method of Clause 2, wherein the increase is based on a formula for PUSCH power control that increases PUSCH transmission power as a function of the one or more UTOs indicated in the second signaling.

Clause 4: The method of Clause 3, wherein the formula includes at least one parameter whose value depends on the one or more UTOs indicated in the second signaling.

Clause 5: The method of Clause 4, wherein the at least one parameter comprises a closed loop power control parameter that depends on the one or more UTOs indicated in the second signaling.

Clause 6: The method of Clause 5, wherein the closed loop power control parameter is a value greater than zero only if one or more conditions are met.

Clause 7: The method of Clause 6, wherein the one or more conditions are met if at least one of: a quantity of the UTOs indicated in the second signaling is greater than or equal to a threshold quantity; or a time window from a first of the one or more UTOs to a last of the one or more UTOs is greater than a threshold time duration.

Clause 8: The method of Clause 5, wherein a value of the closed loop power control parameter is based on at least one of: broadcast signaling; radio resource control (RRC), medium access control (MAC) control element (CE), or downlink control information (DCI) signaling; or control information conveyed via the second signaling.

Clause 9: The method of Clause 5, wherein a value of the closed loop power control parameter is based on at least one of a defined value or a defined function.

Clause 10: The method of Clause 5, wherein a value of the closed loop power control parameter is based on a budget interval defined by a minimum value and a maximum value.

Clause 11: The method of Clause 5, further comprising providing a value of the closed loop power control parameter in a power headroom report (PHR).

Clause 12: The method of any one of Clauses 1-11, further comprising obtaining third signaling configuring the first wireless node for the adjustment of the transmit power on at least one of: a per band basis, a per bandwidth part (BWP) basis, a per configured grant (CG) basis, or a per beam basis.

Clause 13: The method of any one of Clauses 1-12, wherein the adjustment of the transmit power is triggered based on a location of the first wireless node.

Clause 14: The method of any one of Clauses 1-13, wherein: the adjustment is based on a formula that includes at least one parameter whose value depends on the one or more UTOs indicated in the second signaling; and the at least one parameter comprises at least one of a first parameter that indicates a received power target or a second parameter that indicates a fractional power control factor.

Clause 15: The method of Clause 14, wherein: wherein the at least one parameter comprises both the first parameter and the second parameter; and values of the first and second parameters are based on the one or more UTOs indicated in the second signaling and a sounding reference signal (SRS) resource indicator (SRI) value.

Clause 16: A method for wireless communications at a second wireless node, comprising: outputting first signaling configuring a first wireless node with transmission occasions (TOs); and outputting second signaling configuring the first wireless node to adjust transmit power of a current or future transmission based on one or more unused TOs (UTOs) that correspond to one or more of the configured TOs that will be skipped by the first wireless node.

Clause 17: The method of Clause 16, wherein the TOs are for transmitting a physical uplink shared channel (PUSCH).

Clause 18: The method of Clause 17, further comprising obtaining third signaling indicating the one or more UTOs, wherein the adjustment is based on a formula for PUSCH power control that increases PUSCH transmission power as a function of the one or more UTOs indicated in the second signaling.

Clause 19: The method of Clause 18, wherein the formula includes at least one parameter whose value depends on the one or more UTOs indicated in the second signaling.

Clause 20: The method of Clause 19, wherein the at least one parameter comprises a closed loop power control parameter that depends on the one or more UTOs indicated in the third signaling.

Clause 21: The method of Clause 20, wherein: the closed loop power control parameter is a value greater than zero only if one or more conditions are met; and the second signaling indicates information regarding the one or more conditions.

Clause 22: The method of Clause 21, wherein the one or more conditions are met if at least one of: a quantity of the UTOs indicated in the second signaling is greater than or equal to a threshold quantity; or a time window from a first of the one or more UTOs to a last of the one or more UTOs is greater than a threshold time duration, wherein the second signaling indicates at least one of the threshold quantity or the threshold time duration.

Clause 23: The method of Clause 20, wherein: a value of the closed loop power control parameter is based on the second signaling; and the second signaling comprise at least one of: broadcast signaling; or radio resource control (RRC), medium access control (MAC) control element (CE), or downlink control information (DCI) signaling.

Clause 24: The method of Clause 20, further comprising obtaining a value of the closed loop power control parameter in a power headroom report (PHR) from the first wireless node.

Clause 25: The method of any one of Clauses 16-24, wherein the second signaling configures the first wireless node for the adjustment of the transmit power on at least one of: a per band basis, a per bandwidth part (BWP) basis, a per configured grant (CG) basis, or a per beam basis.

Clause 26: An apparatus, comprising: at least one memory comprising executable instructions; and at least one processor configured to execute the executable instructions and cause the apparatus to perform a method in accordance with any one of Clauses 1-25.

Clause 27: An apparatus, comprising means for performing a method in accordance with any one of Clauses 1-25.

Clause 28: A non-transitory computer-readable medium comprising executable instructions that, when executed by at least one processor of an apparatus, cause the apparatus to perform a method in accordance with any one of Clauses 1-25.

Clause 29: A computer program product embodied on a computer-readable storage medium comprising code for performing a method in accordance with any one of Clauses 1-25.

Clause 30: A network node (e.g., a UE), comprising: at least one transceiver; a memory comprising executable instructions; and one or more processors, individually or collectively, configured to execute the executable instructions and cause the AP to perform a method in accordance with any one of Clauses 1-15, wherein the at least one transceiver is configured to: receive the first signaling and transmit the second signaling.

Clause 31: A network node (e.g., a network entity), comprising: at least one transceiver; a memory comprising executable instructions; and one or more processors, individually or collectively, configured to execute the executable instructions and cause the AP to perform a method in accordance with any one of Clauses 16-25, wherein the at least one transceiver is configured to: transmit the first signaling and receive the second signaling.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a graphics processing unit (GPU), a neural processing unit (NPU), a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

Means for obtaining, means for outputting, means for providing, and means for adjusting may comprise one or more processors, such as one or more of the processors described above with reference to FIG. 11.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, comprising:

at least one transceiver;

at least one memory comprising instructions; and one or more processors, individually or collectively, configured to execute the instructions to cause the apparatus to:

receive, via the at least one transceiver, first signaling configuring the apparatus with transmission occasions (TOs);

transmit, via the at least one transceiver, second signaling indicating one or more unused TOs (UTOs) that correspond to one or more of the configured TOs that will be skipped by the apparatus; and adjust transmit power of a current transmission or a future transmission based on the one or more UTOs indicated in the second signaling, wherein:

the adjustment is based on a formula that includes at least one parameter whose value depends on the one or more UTOs indicated in the second signaling.

2. The apparatus of claim 1, wherein:

the TOs are for transmitting a physical uplink shared channel (PUSCH); and the adjustment comprises increasing transmit power of a current or future PUSCH transmission.

3. The apparatus of claim 2, wherein the increase is based on a formula for PUSCH power control that increases PUSCH transmission power as a function of the one or more UTOs indicated in the second signaling.

4. The apparatus of claim 3, wherein the formula includes at least one parameter whose value depends on the one or more UTOs indicated in the second signaling.

5. The apparatus of claim 4, wherein the at least one parameter comprises a closed loop power control parameter that depends on the one or more UTOs indicated in the second signaling.

6. The apparatus of claim 5, wherein the closed loop power control parameter is a value greater than zero only if one or more conditions are met.

7. The apparatus of claim 6, wherein the one or more conditions are met if at least one of:

a quantity of the UTOs indicated in the second signaling is greater than or equal to a threshold quantity; or a time window from a first of the one or more UTOs to a last of the one or more UTOs is greater than a threshold time duration.

8. The apparatus of claim 5, wherein a value of the closed loop power control parameter is based on at least one of:

broadcast signaling;

radio resource control (RRC), medium access control (MAC) control element (CE), or downlink control information (DCI) signaling; or control information conveyed via the second signaling.

9. The apparatus of claim 5, wherein a value of the closed loop power control parameter is based on at least one of a defined value or a defined function.

10. The apparatus of claim 5, wherein a value of the closed loop power control parameter is based on a budget interval defined by a minimum value and a maximum value.

11. The apparatus of claim 5, wherein the one or more processors, individually or collectively, are further configured to provide a value of the closed loop power control parameter in a power headroom report (PHR).

12. The apparatus of claim 1, wherein the one or more processors, individually or collectively, are further configured to receive, via the at least one transceiver, third signaling configuring the apparatus for the adjustment of the transmit power on at least one of: a per band basis, a per bandwidth part (BWP) basis, a per configured grant (CG) basis, or a per beam basis.

13. The apparatus of claim 1, wherein the adjustment of the transmit power is triggered based on a location of the apparatus.

14. The apparatus of claim 1, wherein;

the at least one parameter comprises at least one of a first parameter that indicates a received power target or a second parameter that indicates a fractional power control factor.

15. The apparatus of claim 14, wherein at least one of:

the at least one parameter comprises both the first parameter and the second parameter; or values of the first and second parameters are based on the one or more UTOs indicated in the second signaling and a sounding reference signal (SRS) resource indicator (SRI) value.

16. The apparatus of claim 1, wherein the apparatus is configured to operate as a user equipment (UE).

17. An apparatus for wireless communication, comprising:

at least one memory comprising instructions; and one or more processors, individually or collectively, configured to execute the instructions and cause the apparatus to:

transmit, via the at least one transceiver, first signaling configuring a wireless node with transmission occasions (TOs); and transmit, via the at least one transceiver, second signaling configuring the wireless node to adjust transmit power of a current transmission or a future transmission based on one or more unused TOs (UTOs) that correspond to one or more of the configured TOs that will be skipped by the wireless node, wherein at least one of:

the adjustment is based on a formula that includes at least one parameter whose value depends on the one or more UTOs indicated in the second signaling.

18. The apparatus of claim 17, wherein the TOs are for transmitting a physical uplink shared channel (PUSCH).

19. The apparatus of claim 18, wherein the one or more processors, individually or collectively, are further configured to receive, via the at least one transceiver, third signaling indicating the one or more UTOs, wherein the adjustment is based on a formula for PUSCH power control that increases PUSCH transmission power as a function of the one or more UTOs indicated in the second signaling.

20. The apparatus of claim 19, wherein the formula includes at least one parameter whose value depends on the one or more UTOs indicated in the second signaling.

21. The apparatus of claim 20, wherein the at least one parameter comprises a closed loop power control parameter that depends on the one or more UTOs indicated in the third signaling.

22. The apparatus of claim 21, wherein:

the closed loop power control parameter is a value greater than zero only if one or more conditions are met; and the second signaling indicates information regarding the one or more conditions.

23. The apparatus of claim 22, wherein the one or more conditions are met if at least one of:

a quantity of the UTOs indicated in the second signaling is greater than or equal to a threshold quantity; or a time window from a first of the one or more UTOs to a last of the one or more UTOs is greater than a threshold time duration, wherein the second signaling indicates at least one of the threshold quantity or the threshold time duration.

24. The apparatus of claim 21, wherein:

a value of the closed loop power control parameter is based on the second signaling; and the second signaling comprise at least one of:

broadcast signaling; or radio resource control (RRC), medium access control (MAC) control element (CE), or downlink control information (DCI) signaling.

25. The apparatus of claim 21, wherein the one or more processors, individually or collectively, are further configured to receive, via the at least one transceiver, a value of the closed loop power control parameter in a power headroom report (PHR) from the wireless node.

26. The apparatus of claim 17, wherein the second signaling configures the wireless node for the adjustment of the transmit power on at least one of: a per band basis, a per bandwidth part (BWP) basis, a per configured grant (CG) basis, or a per beam basis.

27. The apparatus of claim 17, wherein the apparatus is configured to operate as a network entity.

28. The apparatus of claim 17, wherein the at least one parameter comprises at least one of a first parameter that indicates a received power target or a second parameter that indicates a fractional power control factor.

29. A method for wireless communications by at a first wireless node, comprising:

receiving first signaling configuring the first wireless node with transmission occasions (TOs);

transmitting second signaling indicating one or more unused TOs (UTOs) that correspond to one or more of the configured TOs that will be skipped by the first wireless node; and adjusting transmit power of a current or future transmission based on the one or more UTOs indicated in the second signaling, wherein at least one of:

the adjustment is based on a formula that includes at least one parameter whose value depends on the one or more UTOs indicated in the second signaling; or the at least one parameter comprises at least one of a first parameter that indicates a received power target or a second parameter that indicates a fractional power control factor.

* * * * *